United States Patent
Jing et al.

(10) Patent No.: US 10,094,653 B2
(45) Date of Patent: *Oct. 9, 2018

(54) DETECTION DEVICE AND DETECTION METHOD

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yangkun Jing, Beijing (CN); Changjun Jiang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/627,948

(22) Filed: Jun. 20, 2017

(65) Prior Publication Data

US 2017/0284791 A1  Oct. 5, 2017

Related U.S. Application Data (63) Continuation-in-part of application No. 14/741,697, filed on Jun. 17, 2015, now Pat. No. 9,709,385.

(30) Foreign Application Priority Data

Jan. 22, 2015 (CN) .......................... 2015 1 0033042

(51) Int. Cl.
*G01B 11/02* (2006.01)
*G01B 11/06* (2006.01)
(Continued)

(52) U.S. Cl.
CPC ........ *G01B 11/0675* (2013.01); *G01B 9/0203* (2013.01); *G01B 9/02016* (2013.01); *G01J 2009/0238* (2013.01)

(58) Field of Classification Search
CPC ............ G01B 11/0625; G01B 11/0683; G01B 11/0675; G01B 9/02; G01B 11/06
(Continued)

(56) References Cited

U.S. PATENT DOCUMENTS

| 4,660,980 A | 4/1987 | Takabayashi et al. |
| 5,650,621 A | 7/1997 | Tsuneta et al. |

(Continued)

FOREIGN PATENT DOCUMENTS

| CN | 1156243 | 8/1997 |
| CN | 1904547 A | 1/2007 |

OTHER PUBLICATIONS

First Office Action of corresponding CN application 201510033042.X with search report, dated Dec. 5, 2016, with English Translation.

*Primary Examiner* — Md M Rahman
(74) *Attorney, Agent, or Firm* — Nath, Goldberg & Meyer; Joshua B. Goldberg; Scott Blackman (57) ABSTRACT

The present invention provides a detection device and a detection method. The detection device comprises a light source module, a receiving module, an image generation module and a judgment module. The light source module is configured to emit light towards a film at a predetermined angle, the receiving module is configured to receive interference light formed by first reflected light reflected by an upper surface of the film and second reflected light reflected by a lower surface of the film, the image generation module is configured to generate an equal thickness interference fringe image according to the interference light, and the judgment module is configured to judge whether thickness of the film is uniform according to the equal thickness (Continued)

interference fringe image. The detection device can perform high accuracy detection on uniformity of the thickness of a film, thereby facilitating improving display quality of a display panel.

5 Claims, 4 Drawing Sheets

(51) Int. Cl.
    *G01B 9/02*     (2006.01)
    *G01J 9/02*     (2006.01)

(58) Field of Classification Search
    USPC .......................................................... 356/503
    See application file for complete search history.

(56) References Cited

U.S. PATENT DOCUMENTS

| | | |
|---|---|---|
| 2005/0157308 A1 | 7/2005 | Brunfeld et al. |
| 2006/0044567 A1 | 3/2006 | Ueki |
| 2007/0229842 A1* | 10/2007 | Jansen .................. G01B 11/06 |
| | | 356/492 |
| 2009/0047418 A1 | 2/2009 | Miura et al. |

* cited by examiner

DETECTION DEVICE AND DETECTION METHOD

This is a Continuation-In-Part of U.S. patent application Ser. No. 14/741,697, filed Jun. 17, 2015, an application claiming the benefit to Chinese Application No. 20151003042.X, filed on Jan. 22, 2015, the content of each of which is hereby incorporated by reference in its entirety.

FIELD OF THE INVENTION

The present invention relates to the field of display technology, in particular to a detection device and a detection method.

BACKGROUND OF THE INVENTION

To enable a liquid crystal material to pre-form regular arrangement and alignment on a surface of a glass substrate, it is required to pre-form an alignment film on the surface of the glass substrate. First, an alignment film material is applied on the surface of the glass substrate by way of printing; then, alignment processing such as optical alignment processing, voltage alignment processing or rubbing alignment processing is performed on the alignment film material so as to cause the alignment film material to be in an alignment state, thereby forming the alignment film. However, the alignment film formed by this technology may have a problem of non-uniform thickness, and thus the display quality of a display panel is influenced.

SUMMARY OF THE INVENTION

To solve the above problem, the present invention provides a detection device and a detection method, in order to solve the problem that the alignment film formed in the prior art may have non-uniform thickness and thus influences the display quality of a display panel.

For this purpose, the present invention provides a detection device, including a light source module, a receiving module which is a sensor or a charge coupled device, an image generation module which is a camera and a judgment module which is a comparator, wherein the image generation module is connected to the receiving module and the judgment module, respectively; the light source module is configured to emit light towards a film at a predetermined angle; the receiving module is configured to receive interference light formed by first reflected light reflected by an upper surface of the film and second reflected light reflected by a lower surface of the film; the image generation module is configured to generate an equal thickness interference fringe image according to the interference light; and, the judgment module is configured to judge whether thickness of the film is uniform according to the equal thickness interference fringe image.

Optionally, the detection device further includes a correction module which is a corrector, wherein the correction module is connected to the image generation module and the judgment module, respectively; the correction module is configured to correct the equal thickness interference fringe image according to a predetermined sensitivity, the predetermined sensitivity being a ratio of a variation in reflectivity of the film to a variation in thickness of the film; and, the judgment module is configured to judge whether the thickness of the film is uniform according to the corrected equal thickness interference fringe image.

Optionally, the detection device further includes a storage module which is a memory, wherein the storage module is connected to the correction module; and, the storage module is configured to store information about the predetermined sensitivity.

Optionally, the detection device further includes a contrast enhancement module which is a contrast enhancer, wherein the contrast enhancement module is connected to the image generation module and the judgment module, respectively; the contrast enhancement module is configured to enhance contrast of the equal thickness interference fringe image; and, the judgment module is configured to judge whether the thickness of the film is uniform according to the equal thickness interference fringe image having enhanced contrast.

Optionally, the detection device further includes a conversion module which is an analog-to-digital converter, wherein the conversion module is connected to the image generation module and the judgment module, respectively; the conversion module is configured to convert the equal thickness interference fringe image into digital signals in a case where the equal thickness interference fringe image comprises an analog signal; and, the judgment module is configured to compare the digital signals of the equal thickness interference fringe image with digital signals of a standard equal thickness interference fringe image, so as to judge whether the thickness of the film is uniform.

Optionally, the detection device further includes a filter processing module which is a filter, wherein the filter processing module is connected to the receiving module and the image generation module, respectively; the filter processing module is configured to filter interference light beyond a predetermined frequency range; and, the image generation module is configured to generate an equal thickness interference fringe image according to the filtered interference light.

The present invention further provides a detection method, which is performed by using a detection device, wherein the detection device includes a light source module, a receiving module, an image generation module and a judgment module, the image generation module is connected to the receiving module and the judgment module, respectively, and the detection method includes steps of: emitting, by the light source module, light towards a film at a predetermined angle; receiving, by the receiving module, interference light formed by first reflected light reflected by an upper surface of the film and second reflected light reflected by a lower surface of the film; generating, by the image generation module, an equal thickness interference fringe image according to the interference light; and, judging, by the judgment module, whether thickness of the film is uniform according to the equal thickness interference fringe image.

Optionally, the detection device further includes a correction module, which is connected to the image generation module and the judgment module, respectively; before the step of judging, by the judgment module, whether thickness of the film is uniform according to the equal thickness interference fringe image, the detection method further includes a step of: correcting, by the correction module, the equal thickness interference fringe image according to a predetermined sensitivity; and, the step of judging, by the judgment module, whether thickness of the film is uniform according to the equal thickness interference fringe image includes: judging, by the judgment module, whether the thickness of the film is uniform according to the corrected equal thickness interference fringe image.

Optionally, the detection device further includes a contrast enhancement module, which is connected to the image generation module and the judgment module, respectively; before the step of judging, by the judgment module, whether thickness of the film is uniform according to the equal thickness interference fringe image, the detection method further includes a step of: enhancing, by the contrast enhancement module, contrast of the equal thickness interference fringe image; and, the step of judging, by the judgment module, whether thickness of the film is uniform according to the equal thickness interference fringe image includes: judging, by the judgment module, whether the thickness of the film is uniform according to the equal thickness interference fringe image having enhanced contrast.

Optionally, the detection device further includes a conversion module, which is connected to the image generation module and the judgment module, respectively; before the step of judging, by the judgment module, whether thickness of the film is uniform according to the equal thickness interference fringe image, the detection method further includes a step of: converting, by the conversion module, the equal thickness interference fringe image into digital signals; and, the step of judging, by the judgment module, whether thickness of the film is uniform according to the equal thickness interference fringe image includes: comparing, by the judgment module, the digital signals of the equal thickness interference fringe image with digital signals of a standard equal thickness interference fringe image, so as to judge whether the thickness of the film is uniform.

Optionally, the detection device further includes a filter processing module, which is connected to the receiving module and the image generation module, respectively; before the step of generating, by the image generation module, an equal thickness interference fringe image according to the interference light, the detection method further includes a step of: filtering, by the filter processing module, interference light beyond a predetermined frequency range; and, the step of generating, by the image generation module, an equal thickness interference fringe image according to the interference light includes: generating, by the image generation module, an equal thickness interference fringe image according to the filtered interference light.

The present invention has the beneficial effects as follows.

The detection device and detection method provided by the present invention can perform a high accuracy detection on uniformity of the thickness of a film. Therefore, the thickness of the film may be adjusted according to the result of detection, so as to ensure the uniformity of the thickness of the film, thereby improving the display quality of a display panel.

DETAILED DESCRIPTION OF THE EMBODIMENTS

To make those skilled in the art better understand the technical solutions of the present invention, the detection device and detection method provided by the present invention will be described in details below with reference to the accompanying drawings.

First Embodiment

Figure 1:
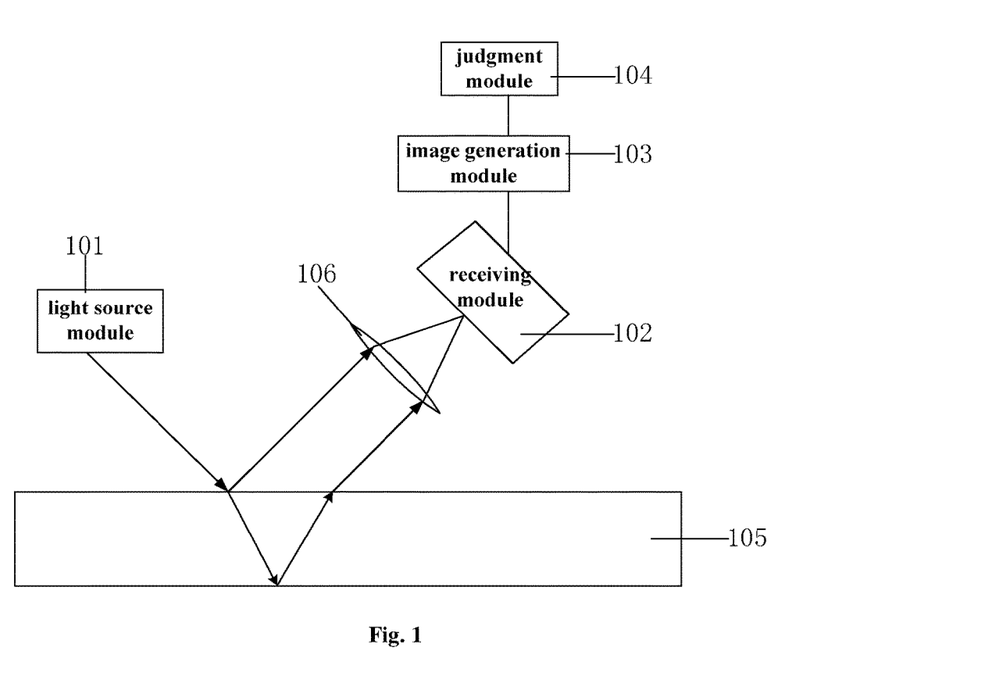
FIG. 1 is a schematic diagram of a structure of a detection device provided by a first embodiment of the present invention.
Figure 2:
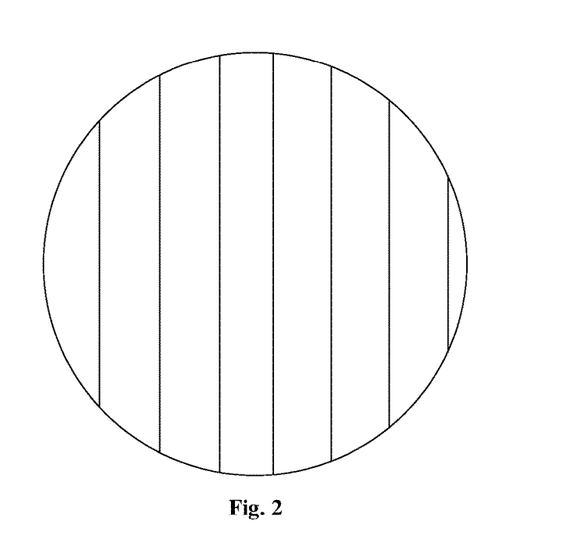
FIG. 2 is a schematic diagram of an interference fringe formed when the thickness of a film is uniform.
Figure 3:
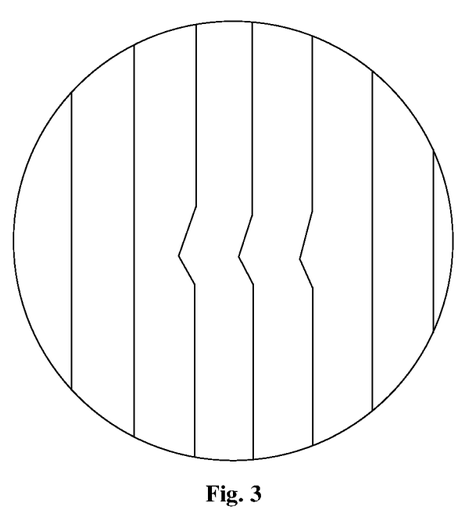
FIG. 3 is a schematic diagram of an interference fringe formed when the thickness of a film is not uniform.
Figure 4:
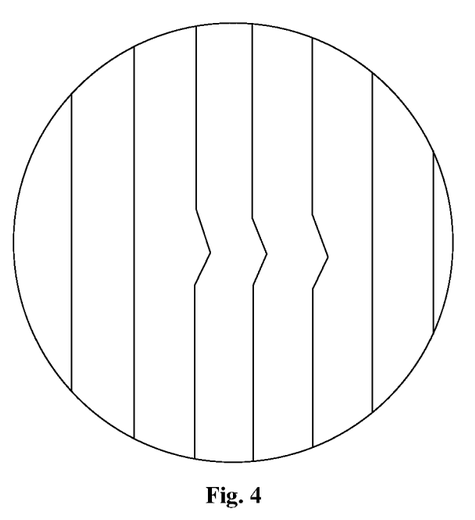
FIG. 4 is a schematic diagram of another interference fringe formed when the thickness of a film is not uniform.

FIG. 1 is a schematic diagram of a structure of a detection device provided by the first embodiment of the present invention. As shown in FIG. 1, the detection device includes a light source module 101, a receiving module 102, an image generation module 103 and a judgment module 104. The image generation module 103 may be a camera such as a film camera or a digital camera. The camera may be configured to take a picture of the interference fringes received by the receiving module 102 to generate an interference fringe image. The film camera (e.g., a CCD video camera) may generate an interference fringe image including analog signals, whereas the digital camera may generate an interference fringe image including digital signals. The judgment module 104 may be a comparator which may be implemented by software. The comparator that may be configured to judge whether thickness of a film is uniform by comparing distances between two adjacent ones of the interference fringes of the film with each other. If the distances between two adjacent ones of the interference fringes are all a predetermined value, thickness of the film is uniform, as shown in FIG. 2. If the distances between two adjacent ones of the interference fringes are not a predetermined value, thickness of the film is non-uniform, and the film is depressed downwards (as shown in FIG. 3) or protrudes upwards (as shown in FIG. 4). Thus, the judgment module judges whether thickness of the film is uniform or not. The image generation module 103 is connected to the receiving module 102 and the judgment module 104, respectively. The light source module 101 emits light to a film 105 at a determined angle, and the receiving module 102 receives interference light formed by first reflected light reflected by an upper surface of the film 105 and second reflected light reflected by a lower surface of the film 105. The first reflected light reflected by the upper surface of the film 105 and the second reflected light reflected by the lower surface of the film 105 are from the same incident light but have a constant phase difference only because they go through different paths, and therefore, the first reflected light and the second reflected light are coherent light and will interfere with each other. Herein, light formed by the mutual interference of the first reflected light and the second reflected light is called interference light. The interference light is received by the receiving module 102 after being focused by a lens. The image generation module 103 generates an interference fringe image based on the interference light received by the receiving module 102. The receiving module 102 converts an optical signal into an electric signal, and may be a sensor, a monochrome sensor, a charge coupled device (CCD), etc. Optionally, the lens is a convex lens 106, and the receiving module 102 is arranged on a focusing plane of the convex lens 106. The image generation module 103 generates an interference fringe image according to the interference light received by the receiving module 102. The judgment module 104 may judge whether the thickness of the film is uniform according to the interference fringe image. The detection device provided by this embodiment can perform a high accuracy detection on uniformity of the thickness of the film. Therefore, the thickness of the film may be adjusted according to the result of detection, so as to ensure the uniformity of the thickness of the film, thereby improving the display quality of a display panel.

It should be understood that, as shown in FIG. 1, in the present invention, the upper surface of the film 105 refers to a light incidence surface of the film 105, and the lower surface of the film 105 refers to a surface opposite to the light incidence surface of the film 105.

It should be also understood that, the first reflected light and the second reflected light interfere with each other and interference fringes may be generated. Therefore, the interference light received by the receiving module 102 may be interference fringes, and the image generation module 103 generates an interference fringe image based on the interference fringes received by the receiving module 102.

It should be also understood that, the interference fringes may be equal thickness interference fringes, and the equal thickness interference fringe image may be an equal thickness interference fringe image, as shown in FIGS. 2 to 4.

In this embodiment, in a case that both the wavelength and incident angle of the light emitted from the light source module 101 are given, the film having the same thickness corresponds to interference fringes of the same level. Therefore, in the interference fringe image generated by the image generation module 103, the interference fringes are interference fringes having an equal thickness. FIG. 2 is a schematic diagram of an interference fringe image generated when the thickness of a film is uniform. As shown in FIG. 2, when the thickness of the film 105 is uniform, the interference fringes in the interference fringe image generated by the image generation module 103 are parallel isometric straight fringes. When the thickness of the film 105 is not uniform, the interference fringes in the interference fringe image generated by the image generation module 103 will be curved correspondingly. A deviation trend and a deviation magnitude of the thickness of the film 105 may be judged according to the curved direction and curvature of the interference fringes.

Preferably, the detection device further includes a conversion module 110, which is connected to the image generation module 103 and the judgment module 104, respectively. The conversion module 110 may be an analog-to-digital converter that is configured to convert the interference fringe image generated by the image generation module 103 into digital signals in a case where the interference fringe image includes an analog signal, and the judgment module compares the digital signals of the interference fringe image with digital signals of a standard interference fringe image (e.g., the interference fringe image shown in FIG. 2) (the digital signals of the standard interference fringe image may be pre-stored in the judgment module), so as to judge whether the thickness of the film is uniform. It should be noted that, the conversion module 110 may be omitted in a case where the interference fringe image generated by the image generation module 103 includes only digital signals. FIG. 3 is a schematic diagram of an interference fringe image generated when the thickness of a film is not uniform. As shown in FIG. 3, the interference fringes in the interference fringe image generated by the image generation module 103 are curved, and the curved direction is leftward. By comparing the digital signals of the interference fringe image in FIG. 3 with the digital signals of the standard interference fringe image in FIG. 2, it can be judged that the film 105 has a non-uniform thickness and is depressed downwards. FIG. 4 is a schematic diagram of another interference fringe image generated when the thickness of a film is not uniform. As shown in FIG. 4, the interference fringes in the interference fringe image generated by the image generation module 103 are curved, and the curved direction is rightward. By comparing the digital signals of the interference fringe image in FIG. 4 with the digital signals of the standard interference fringe image in FIG. 2, it can be judged that the film 105 has a non-uniform thickness and protrudes upwards. By converting an image signal into a digital signal for comparison, the accuracy of judgment can be improved.

In this embodiment, the interference fringe image is obtained through receiving the coherent light reflected by both the upper and lower surfaces of the film, and whether the thickness of the film is uniform is detected based on the interference fringe image. However, as the reflectivity of light changes with the thickness of the film, whether the thickness of the film is uniform often cannot be accurately detected based on the interference fringe image formed from the interference light. In practical applications, the light source module 101 emits light towards the film 105 at a predetermined angle, and the reflectivity of the film 105 to light changes with the thickness of the film 105. The reason why the reflectivity changes is as follows: the reflected light of the film 105 actually is coherent light formed by first reflected light reflected by the upper surface of the film 105 and second reflected light reflected by the lower surface of the film 105. Here, the thickness of the film is set as x, and the reflectivity y may be represented as the following function:

$y=f_y(x)$, where the refractive index of the film 105, the refractive index of air and the incident angle of light are preset. The sensitivity S is equal to (dy)/(dx), i.e., $S=(dy)/(dx)=f_y'(x)$. In other words, the function $f_y(x)$ is differentiated by the thickness x of the film so as to obtain the function $f_y'(x)$. Therefore, the sensitivity S may be represented as the following function:

$S=f_y'(x)$, where the refractive index of the film 105, the refractive index of air and the incident angle of light are preset. Thus, the sensitivity may be defined as a ratio of a variation in reflectivity of the film to a variation in thickness of the film.

Figure 6:
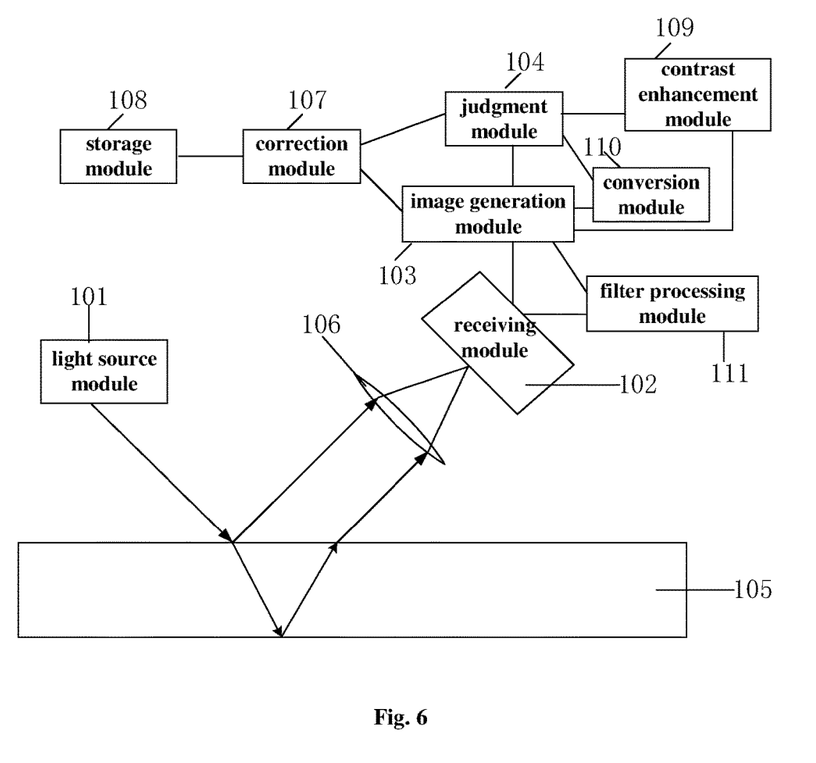
FIG. 6 is a schematic diagram of a structure of a detection device provided by another embodiment of the present invention.

In this embodiment, the detection device may further include a correction module 107, and the impact of the variation in thickness of the film on the reflectivity of light may be eliminated by the correction module 107, as shown in FIG. 6. The correction module 107 may be a corrector, which may be implemented by software and configured to correct the interference fringe image according to a predetermined sensitivity. The correction module 107 is connected to the image generation module 103 and the judgment module 104, respectively. The correction module 107 corrects the interference fringe image according to a predetermined sensitivity, which is a ratio of a variation in reflectivity of the film to a variation in thickness of the film, and the judgment module judges whether the thickness of the film is uniform according to the corrected interference fringe image. Preferably, the detection device further includes a storage module 108, which is connected to the correction module 107. The storage module 108 may be a memory or any other known storage device. The storage module 108 stores the predetermined sensitivity. With the predetermined sensitivity, the correction module 107 can correct a part of the interference fringe image, to which the film corresponding has a sensitivity beyond a predetermined range, so that the impact of the variation in reflectivity of light on the generated interference fringe image is reduced, and the accuracy of the detection device in detecting uniformity of the thickness of the film is improved.

In practical applications, the detection device may further include a contrast enhancement module 109, which is connected to the image generation module 103 and the judgment module 104, respectively. The contrast enhancement module 109 is configured to enhance the contrast of the interference fringe image. For example, the contrast enhancement module 109 may be a contrast enhancer which may be implemented by software. The contrast enhancer may enhance the contrast of a pixel of the interference fringe image by increasing the brightness value of the pixel of the interference fringe image, thereby enhancing the contrast of the interference fringe image. The judgment module 104 judges whether the thickness of the film is uniform according to the interference fringe image having enhanced contrast. The contrast enhancement module 109 enhances the contrast of the interference fringe image, thereby improving the contrast of the interference fringe image and improving the accuracy of the detection device in detecting uniformity of the thickness of the film.

Preferably, the detection device further includes a filter processing module 111, which may be connected to the receiving module 102 and the image generation module 103, respectively. The filter processing module 111 may be a filter such as a bandpass filter. The filter processing module 111 is configured to filter interference light beyond a predetermined frequency range. The image generation module 103 generates an interference fringe image according to the filtered interference light. In the interference light formed by the first reflected light and second reflected light reflected by the film 105, there may be light beyond a predetermined frequency (e.g., the frequency of the incident light) range, and therefore, interference fringes formed by the interference light are influenced. After the filter processing performed by the filter processing module 111, only interference light within the predetermined frequency range can pass through the filter processing module 111, and then the image generation module 103 generates an interference fringe image according to the filtered interference light, so that the interference of other parasitic light with the interference fringe image formed according to the interference light is eliminated, and the accuracy of the detection device in detecting uniformity of the thickness of the film is improved.

As described above, each of the judgment module 104, the correction module 107, and the contrast enhancement module 109 may be implemented by software. In this case, the judgment module 104, the correction module 107, and the contrast enhancement module 109 may be stored in the storage module 108 or another memory. The detection device may further include a CPU configured to execute the judgment module 104, the correction module 107, and the contrast enhancement module 109.

In the detection device provided by the present invention, the detection device includes a light source module, a receiving module, an image generation module and a judgment module, wherein the light source module is configured to emit light towards a film at a predetermined angle, the receiving module is configured to receive interference light formed by first reflected light reflected by an upper surface of the film and second reflected light reflected by a lower surface of the film, the image generation module is configured to generate an interference fringe image according to the interference light, and the judgment module is configured to judge whether thickness of the film is uniform according to the interference fringe image. The detection device can perform a high accuracy detection on uniformity of the thickness of a film. Therefore, the thickness of the film may be adjusted according to the result of detection, so as to ensure the uniformity of the thickness of the film, thereby improving the display quality of a display panel.

Second Embodiment

Figure 5:
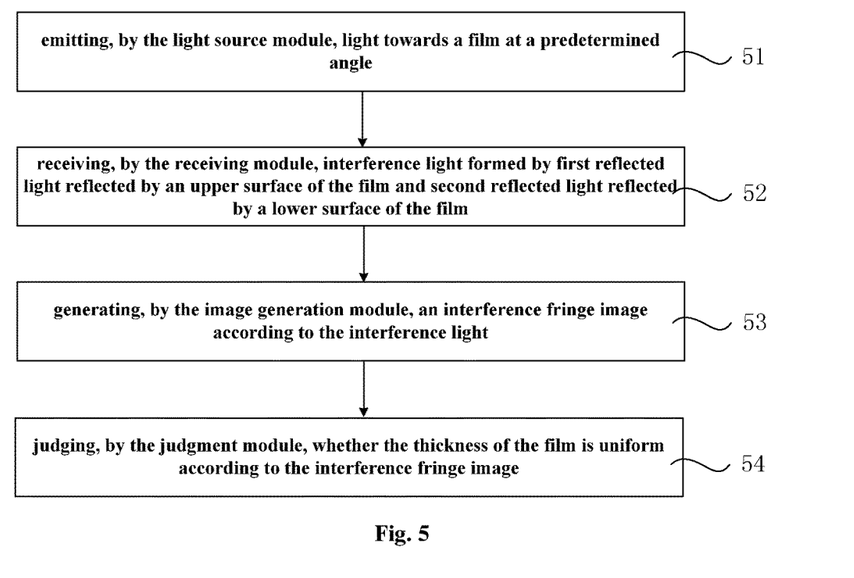
FIG. 5 is a flowchart of a detection method performed by using a detection device, provided by a second embodiment of the present invention.

FIG. 5 is a flowchart of a detection method, which is performed by using a detection device, provided by the second embodiment of the present invention. The detection device may be the detection device provided by the first embodiment. As shown in FIG. 1, the detection device includes a light source module, a receiving module, an image generation module and a judgment module, and the image generation module is connected to the receiving module and the judgment module, respectively.

As shown in FIG. 5, the detection method includes steps as follows.

Step 51: Light is emitted towards a film at a predetermined angle by the light source module.

Step 52: Interference light formed by first reflected light reflected by an upper surface of the film and second reflected light reflected by a lower surface of the film is received by the receiving module.

Referring to FIG. 1, as the first reflected light reflected by the upper surface of the film 105 and the second reflected light reflected by the lower surface of the film 105 are from the same incident light but have a constant phase difference only because they go through different paths, and therefore the first reflected light and the second reflected light are coherent light and will interfere with each other.

Step 53: An interference fringe image is generated according to the interference light by the image generation module.

The interference light is received by the receiving module 102 after being focused by a lens, and the image generation module 103 generates an interference fringe image based on the interference light received by the receiving module 102. Optionally, the lens is a convex lens 106, and the receiving module 102 is arranged on a focusing plane of the convex lens 106.

In this embodiment, in a case that the wavelength and incident angle of the light emitted from the light source module 101 are given, the film having the same thickness corresponds to interference fringes of the same level. Therefore, the interference fringes in the interference fringe image generated by the image generation module 103 are interference fringes having an equal thickness. Referring to FIG. 2, when the thickness of the film 105 is uniform, the interference fringes in the interference fringe image generated by the image generation module 103 are parallel isometric straight fringes. When the thickness of the film 105 is not uniform, the interference fringes in the interference fringe image generated by the image generation module 103 will be curved correspondingly. A deviation trend and a deviation magnitude of the thickness of the film 105 may be judged according to the curved direction and curvature of the interference fringes, as described above.

Preferably, the detection device further includes a filter processing module 111, which is connected to the receiving module and the image generation module, respectively. The filter processing module 111 is configured to filter interference light beyond a predetermined frequency range. The image generation module generates an interference fringe image according to the filtered interference light. In the interference light formed by the mutual interference of the first reflected light reflected by the upper surface of the film 105 and second reflected light reflected by the lower surface of the film 105, there may be light beyond a predetermined frequency range, and therefore, the interference fringe image formed according to the interference light is influenced. After the filter processing performed by the filter processing module 111, only interference light within the predetermined frequency range can pass through the filter processing module 111, and the image generation module 103 generates an interference fringe image according to the filtered interference light, so that the interference of other parasitic light with the interference fringe image formed according to the interference light is eliminated, and the accuracy of the detection device in detecting uniformity of the thickness of the film is improved.

Step 54: Whether the thickness of the film is uniform is judged according to the interference fringe image by the judgment module.

In this embodiment, the detection device may further include a conversion module 110, which is connected to the image generation module 103 and the judgment module 104, respectively. The conversion module 110 converts the interference fringe image into digital signals, and the judgment module compares the digital signals of the interference fringe image with digital signals of a standard interference fringe image, so as to judge whether the thickness of the film is uniform. Referring to FIG. 3, the interference fringes in the interference fringe image generated by the image generation module 103 are curved, and the curved direction is leftward. By comparing the digital signals of the interference fringe image in FIG. 3 with the digital signals of the standard interference fringe image in FIG. 2, it can be judged that the film 105 has a non-uniform thickness and is depressed downwards. Referring to FIG. 4, the interference fringes in the interference fringe image generated by the image generation module 103 are curved, and the curved direction is rightward. By comparing the digital signals of the interference fringe image in FIG. 4 with the digital signals of the standard interference fringe image in FIG. 2, it may be judged that the film 105 has a non-uniform thickness and protrudes upwards. By converting an image signal into a digital signal for comparison, the accuracy of judgment can be improved.

In this embodiment, the interference fringe image is obtained through receiving the coherent light reflected by the film, and whether the thickness of the film is uniform is detected based on the interference fringe image. However, as the reflectivity of light changes with the thickness of the film, whether the thickness of the film is uniform usually cannot be accurately detected based on the interference fringe image formed from the interference light. In practical applications, the light source module 101 emits light towards the film 105 at a predetermined angle, and the reflectivity of the film 105 to light changes with the thickness of the film 105. The reason why the reflectivity changes is as follows: the reflected light of the film 105 actually is coherent light formed by first reflected light reflected by the upper surface of the film 105 and second reflected light reflected by the lower surface of the film 105. Here, the thickness of the film is set as x, and the reflectivity y may be represented as the following function:

$y=f_y(x)$, where the refractive index of the film 105, the refractive index of air and the incident angle of light are preset. The sensitivity S is equal to (dy)/(dx), i.e., $S=(dy)/(dx)=f_y'(x)$. In other words, the function $f_y(x)$ is differentiated by the thickness x of the film so as to obtain the function $f_y'(x)$. Therefore, the sensitivity S may be represented as the following function:

$S=f_y'(x)$, where the refractive index of the film 105, the refractive index of air and the incident angle of light are preset. Thus, the sensitivity may be defined as a ratio of a variation in reflectivity of the film to a variation in thickness of the film.

In this embodiment, the detection device may further include a correction module 107, and the detection method eliminates the impact of the variation in thickness of the film on the reflectivity of light by using the correction module 107, as shown in FIG. 6. The correction module 107 is connected to the image generation module 103 and the judgment module 104, respectively. The correction module 107 corrects the interference fringe image according to a predetermined sensitivity, which is a ratio of a variation in reflectivity of the film to a variation in thickness of the film. The judgment module 104 judges whether the thickness of the film is uniform according to the corrected interference fringe image. Preferably, the detection device further includes a storage module 108, which is connected to the correction module 107. The storage module 108 stores information about the predetermined sensitivity. With the predetermined sensitivity, the correction module 107 can correct a part of the interference fringe image, to which the film corresponding has a sensitivity beyond a predetermined range, so that the impact of the variation in reflectivity of light on the generated interference fringe image is reduced, and the accuracy of the detection device in detecting uniformity of the thickness of the film is improved.

In practical applications, the detection device may further include a contrast enhancement module 109, which is connected to the image generation module 103 and the judgment module 104, respectively. The contrast enhancement module 109 is configured to enhance the contrast of the interference fringe image. The judgment module 104 judges whether the thickness of the film is uniform according to the interference fringe image having enhanced contrast. The contrast enhancement module 109 enhances the contrast of the interference fringe image, thereby improving the contrast of the interference fringe image and improving the accuracy of the detection device in detecting uniformity of the thickness of the film.

The structure of each of the modules in the present embodiment may be referenced to that of each of the modules in the first embodiment, and description thereof is omitted.

In the detection method provided by the present invention, the detection device includes a light source module, a receiving module, an image generation module and a judgment module, and the detecting method comprises steps of: emitting, by the light source module, light towards a film at a predetermined angle; receiving, by the receiving module, interference light formed by first reflected light reflected by an upper surface of the film and second reflected light reflected by a lower surface of the film; generating, by the image generation module, an interference fringe image according to the interference light; and judging, by the judgment module, whether the thickness of the film is uniform according to the interference fringe image. The detection method can perform a high accuracy detection on uniformity of the thickness of a film. Therefore, the thickness of the film may be adjusted according to the result of detection, so as to ensure the uniformity of the thickness of the film, thereby improving the display quality of a display panel.

It should be understood that, the foregoing implementations are exemplary implementations merely for describing the principle of the present invention, but the present invention is not limited thereto. Various variations and improvements may be made by a person of ordinary skill in the art without departing from the spirit and essence of the present invention, and these variations and improvements shall fall into the protection scope of the present invention.

The invention claimed is:

1. A detection device, comprising a light source module, a receiving module which is a sensor or a charge coupled device, an image generation module which is a camera, and a judgment module which is a comparator, wherein the image generation module is connected to the receiving module and the judgment module, respectively;

the light source module is configured to emit light towards a film at a predetermined angle;

the receiving module is configured to receive interference light formed by first reflected light reflected by an upper surface of the film and second reflected light reflected by a lower surface of the film;

the image generation module is configured to generate an equal thickness interference fringe image according to the interference light; and the judgment module is configured to judge whether thickness of the film is uniform according to the equal thickness interference fringe image;

the detection device further comprises a conversion module which is an analog-to-digital converter, wherein the conversion module is connected to the image generation module and the judgment module, respectively;

the conversion module is configured to convert the equal thickness interference fringe image into digital signals in a case where the equal thickness interference fringe image comprises an analog signal; and the judgment module is configured to compare the digital signals of the equal thickness interference fringe image with digital signals of a standard equal thickness interference fringe image, so as to judge whether the thickness of the film is uniform.

2. The detection device according to claim 1, further comprising a correction module which is a corrector, wherein the correction module is connected to the image generation module and the judgment module, respectively;

the correction module is configured to correct the equal thickness interference fringe image according to a predetermined sensitivity, the predetermined sensitivity being a ratio of a variation in reflectivity of the film to a variation in thickness of the film; and the judgment module is configured to judge whether the thickness of the film is uniform according to the corrected equal thickness interference fringe image.

3. The detection device according to claim 2, further comprising a storage module which is a memory, wherein the storage module is connected to the correction module; and the storage module is configured to store information about the predetermined sensitivity.

4. The detection device according to claim 1, further comprising a contrast enhancement module which is a contrast enhancer, wherein the contrast enhancement module is connected to the image generation module and the judgment module, respectively;

the contrast enhancement module is configured to enhance contrast of the equal thickness interference fringe image; and the judgment module is configured to judge whether the thickness of the film is uniform according to the equal thickness interference fringe image having enhanced contrast.

5. The detection device according to claim 1, further comprising a filter processing module which is a filter, wherein the filter processing module is connected to the receiving module and the image generation module, respectively;

the filter processing module is configured to filter interference light beyond a predetermined frequency range; and the image generation module is configured to generate the equal thickness interference fringe image according to the filtered interference light.

* * * * *